Sept. 17, 1940. W. B. THIEMANN 2,214,979
STEERING MECHANISM FOR TRACTORS
Filed Dec. 30, 1937
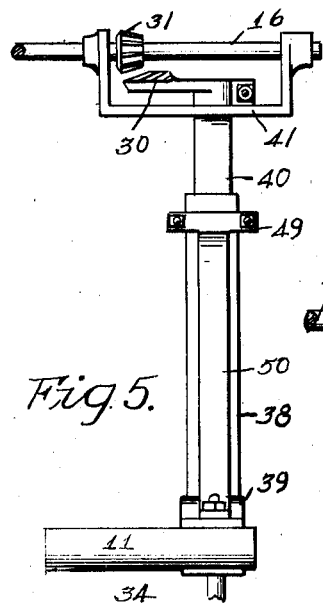
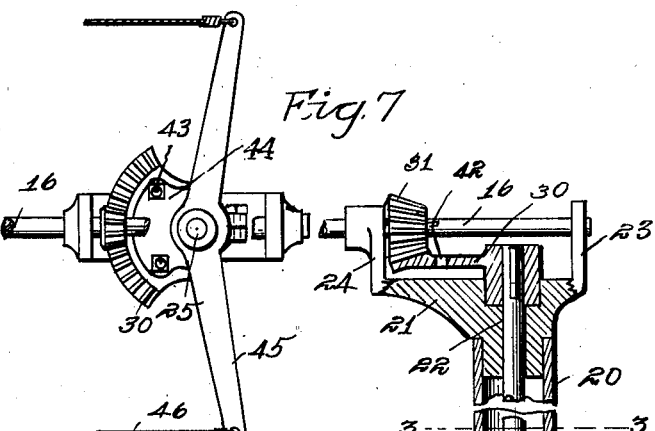
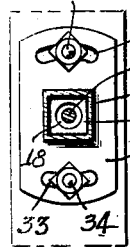
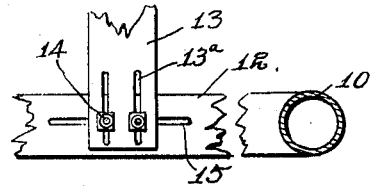
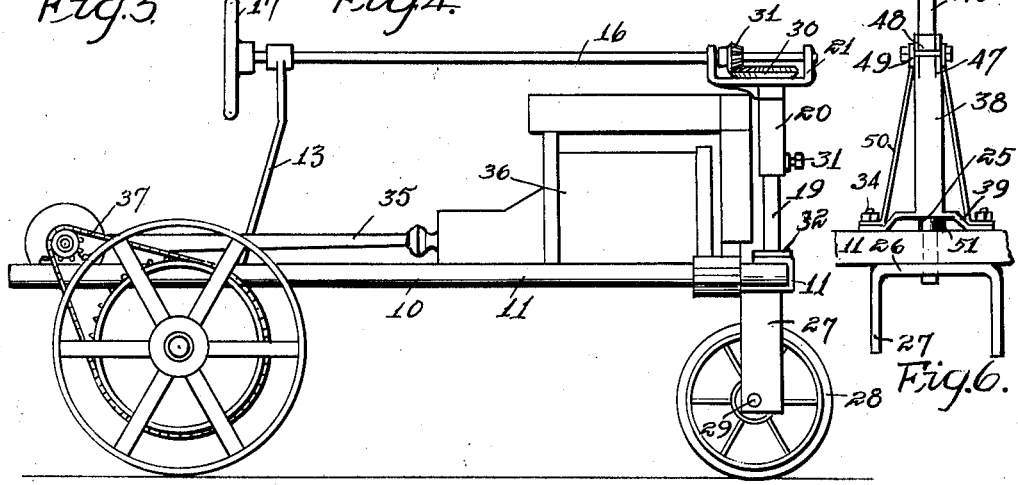
Inventor
W. B. Thiemann Patented Sept. 17, 1940

2,214,979

UNITED STATES PATENT OFFICE 2,214,979

STEERING MECHANISM FOR TRACTORS

William B. Thiemann, Albert City, Iowa

Application December 30, 1937, Serial No. 182,502

4 Claims. (Cl. 280—92)

This invention relates to improvements in steering mechanism for tractors and particularly to that type illustrated and described in my issued Patent No. 2,123,975, of which this is a continuation-in-part, and to provide an adjustable steering mechanism wherein various types of engines may be used on the tractor frame and wherein the hand-controlled steering wheel of said steering mechanism may be shifted transversely of the frame to accommodate the operator at various seated or standing positions.

A further object of my invention is to provide a steering mechanism for tractors including a steering wheel and an upright shaft for controlling said steering wheel and a horizontal shaft for operating the vertical shaft whereby the vertical shaft may be operated from a point near the rear end of the tractor, and whereby the horizontal shaft may be operatively disconnected from the vertical shaft to permit an auxiliary steering arm to be substituted so that the vertical shaft may be steered by means of ropes or lines in place of the horizontal shaft.

A further object of my invention is to provide in a steering mechanism of the type above described employing a vertically arranged steering shaft for controlling the steering means, and means for operating the steering shaft, improved means for raising and lowering the steering shaft operating means whereby the operating means may be adjusted to accommodate various sized engines beneath said operating means.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of a tractor frame showing the manner in which my improved steering mechanism is applied thereto.

Figure 2 is an enlarged detail vertical sectional view of the vertical and adjustable steering post for supporting the vertically arranged steering shaft.

Figure 3 is a detail sectional view taken on the line 3—3 of Figure 2.

Figure 4 is a detail sectional view illustrating a segmental portion of one of the cross-frame members and the manner in which the standard for supporting the horizontal steering shaft is adjustably connected to said frame member.

Figure 5 is a side elevation of a modified form of the steering post for supporting the vertical steering shaft.

Figure 6 is an end elevation of the same on a smaller scale.

Figure 7 is a plan view of the modified form illustrated in Figures 5 and 6, showing the manner in which an auxiliary steering arm may be connected thereto, a portion of the horizontal steering shaft being broken away.

Referring to the accompanying drawing, the numeral 10 indicates generally the frame member of a tractor, including a transversely arranged member 11 at its forward end having the form of a channel in which the forward end of tubular side members 11 are inserted and fixed therein by welding. Supported between the members 11 is a transversely arranged beam 12, to which a vertical standard 13 is adjustably secured, the lower end of the standard 13 having vertical slots 13a for receiving bolts 14, the said bolts 14 being slidably supported in a horizontal slot 15 formed in the said member 12. By this arrangement it will be seen that the standard 13 may be adjusted laterally by moving the bolts 14 in the slot 15, or it may be adjusted vertically by means of the slots 13a, the upper end of the standard 13 being designed to rotatably support the back end of a horizontal steering shaft 16, the rear end of said shaft 16 having a hand-wheel 17 by means of which the shaft 16 may be rotated.

Rotatably supported in the horizontal flanges of the member 11 is a vertically arranged sleeve 18 having its upper end projecting above the member 11 a short distance. Rotatably supported on the sleeve 18 is one member 19 of a telescopic steering post having a member 20 adjustably supported thereon, the members 19 and 20 being preferably rectangular in cross section. The upper end of the member 20 is provided with a head 21 having a central opening 22 and upwardly projecting arms 23 and 24 for supporting the forward end of the shaft 16. The sleeve 18 and the opening 22 of the head 21 are provided with a rotatably mounted and vertically arranged steering shaft 25, the lower end of the shaft 25 being splined in the sleeve 18, which in turn is fixed to a yoke 26 having downwardly extending members 27 between which the steering wheel 28 is supported, this steering wheel being mounted therein by means of a shaft 29. The upper end of the shaft 25 is provided with a segmental beveled gear 30 fixed to said shaft and adapted to mesh with a pinion gear 31 fixed to the shaft 16.

By this arrangement it will be seen that if the steering shaft 16 is rotated, then the beveled gear 30 will be rotated and with it the vertical shaft 25 and the sleeve 18, causing the yoke 26 to also be rotated and the wheel 28 to be steered. By this arrangement it will be seen that the horizontal shaft 16 may be adjusted to various elevated positions to accommodate engines of different types and shapes so that the said shaft 16 may be supported above the engine and its accessories in the manner illustrated in Figure 1, said adjustments being accomplished by sliding the member 20 relative to the member 19 and the shaft 25 in the sleeve 18. After the adjustments have been made said members may be locked in position by means of a set screw 31, the rear end of the shaft 16 being adjusted by means of the adjustable standard 13, as before described.

The member 19 is provided with a base 32 adapted to rest on top of the member 11 and provided with slots 33 for receiving bolts 34 by means of which the angularity of the shaft 16 relative to the longitudinal axis of the frame 11 may be varied simply by moving the standard 13 transversely and causing the standard on the post members 19 and 20 to be rotated about the sleeve 18, thus permitting the standard 13 to be placed to one side of the drive shaft 35 extending from the engine 36 to the drive gear mechanism 37 which is usually located centrally of the frame 11. It is sometimes also desirable to place the standard 13 at one side of the center to accommodate seat arrangements and also to permit the operator to assume standing position if he so desires.

Thus, I have provided means whereby the elevation of the shaft 16 may be adjusted to meet the various working conditions, as well as its angularity, relative to the longitudinal axis of the frame.

In Figures 5, 6 and 7 I have illustrated a slightly modified form of my device in which the telescopic post comprises a lower tubular member 38 supported on a base 39, similar to the base 32, the tubular member 38 being designed to receive a second tubular member 40 adapted to support the head 41, similar to the head 21, to carry the forward end of the shaft 16, the head 41 and the tubular member 40 being adjusted vertically relative to the shaft 25 so that the pinion gear 31 may be elevated from the gear 30, thereby permitting the said gear to be steered independently of the shaft 16. The gear 30 is provided with bolt openings 42 for receiving bolts 43 by means of which a plate 44 may be secured to the upper surface of the gear 30, said plate including a pair of cross-arms 45, the outer ends of which are provided with ropes or lines 46 by means of which the shaft 25 may be steered. The ropes or lines 46 may be then extended rearwardly of the tractor to an implement being drawn by the tractor, thus providing means whereby a single operator may both drive the tractor and also control and operate the machine being drawn by the tractor.

The upper ends of the side members of the tube 38 are provided with slots 47 so as to permit the upper end of the tube 38 to be contracted against the tubular member 40, this being accomplished by means of bolts 48 passed through the plates 49 on the opposite sides of the members 48, said plates 49 being mounted on the upper end of braces 50 which have their lower ends anchored to the bolts 34. The bolts 48 serve to clamp the member 40 in any of its adjusted positions.

A collar 51 is provided on the shaft 25 to provide means for limiting the vertical movement of the said shaft 25 at such times as the pinion 31 is elevated from the gear 30, said collar 55 resting on top of the frame member 11, as clearly illustrated in Figure 6.

Thus it will be seen I have provided a steering mechanism for tractors of relatively simple, durable and inexpensive construction which is particularly adapted to be used on that type of tractor in which an automobile engine is utilized for power purposes, wherein the tractor frame is adapted to be operated by motors of various types in which a horizontal steering shaft 16 may be used, or in its place ropes or lines 46, and in which the angle of the horizontal guide shaft may be adjusted relative to the longitudinal axis of the tractor frame.

I claim as my invention:

1. In a device of the class described, the combination of a tractor frame; a steering wheel supporting one end of said frame; traction wheels supporting the other end of said frame; a vertically arranged shaft for guiding said steering wheel; a horizontal steering shaft; gear mechanism operatively connecting said horizontal and vertical steering shafts; a steering column; a bracket carried by the upper end of said column supporting said gears and one end of said horizontal steering shaft; means for adjusting the steering column and shaft as to height to vary the distance between said horizontal shaft and said tractor frame; and means adjustably connecting the steering column to said frame to rotate about the vertical steering shaft, whereby the angle of the horizontal steering shaft may be varied relative to the longitudinal axis of said frame.

2. The combination of a tractor frame having traction wheels at one end, a steering wheel at the other end, a vertically arranged telescopic steering shaft for guiding said steering wheel, a telescopic column for supporting the upper end of said steering shaft, a horizontal steering shaft having one end supported by said column, means supporting the other end of said horizontal shaft, means for adjusting said supporting means both vertically and horizontally, and means for operatively connecting the vertical and horizontal steering shafts.

3. The combination of a tractor frame having traction wheels at one end, a steering wheel at the other end, a vertically arranged telescopic steering shaft for guiding said steering wheel, a telescopic column for supporting the upper end of said vertical steering shaft, means for locking said column at various adjusted positions, a horizontal steering shaft having one end supported by said column, means supporting the other end of said horizontal shaft, means for adjusting said supporting means both vertically and horizontally, and means for operatively connecting the vertical and horizontal steering shafts.

4. In a device of the class described, the combination of a tractor frame, a steering wheel supporting the end of said frame, traction wheels supporting the other end of said frame, a vertically arranged shaft for guiding said steering wheel, a horizontal steering shaft, gear mechanism operatively connecting said horizontal and vertical steering shafts, a telescopic steering column, a bracket carried by the upper end of said column supporting said gears and one end of said horizontal steering shaft, a standard for supporting the other end of said horizontal steering shaft, and means adjustably connecting said standard to said tractor frame to move both horizontally and vertically.

WILLIAM B. THIEMANN.